United States Patent [19]
Strong

[11] 3,837,780
[45] Sept. 24, 1974

[54] BLOW MOLDING MACHINE

[76] Inventor: Paul G. Strong, 6530 Kenwater Ave., Canoga Park, Calif. 91304

[22] Filed: May 25, 1973

[21] Appl. No.: 363,828

Related U.S. Application Data

[62] Division of Ser. No. 211,904, Dec. 27, 1971, abandoned.

[52] U.S. Cl...... 425/297, 425/326 B, 425/DIG. 212
[51] Int. Cl............................................ B29c 17/07
[58] Field of Search......... 425/326, 326 B, DIG. 24, 425/DIG. 212, 297, 291; 264/95, 98

[56] References Cited
UNITED STATES PATENTS

| | | | |
|---|---|---|---|
| 3,396,427 | 8/1968 | Raspante | 425/387 B X |
| 3,640,661 | 2/1972 | Gasior et al. | 425/387 B X |
| 3,740,181 | 6/1973 | Uhlig | 425/326 |
| 3,749,541 | 7/1973 | Mehnert | 425/326 |
| 3,767,747 | 10/1973 | Uhlig | 264/98 X |
| 3,769,394 | 10/1973 | Latreille | 264/98 |
| 3,781,395 | 12/1973 | Uhlig | 264/98 X |

*Primary Examiner*—Andrew R. Juhasz
*Assistant Examiner*—W. R. Briggs
*Attorney, Agent, or Firm*—Brisebois & Kruger

[57] ABSTRACT

This invention relates to improvements in machinery and the process for manufacturing all types of blown hollow articles made of thermoplastic materials and particularly those having a neck opening. Means are provided so that after a mold at a first station has closed around a parison and the parison has been severed by the knife, the extruder and knife assembly is caused to move to a second mold station and in so doing they move with them a neck forming pin which is inserted into a neck section of the hollow article.

9 Claims, 9 Drawing Figures

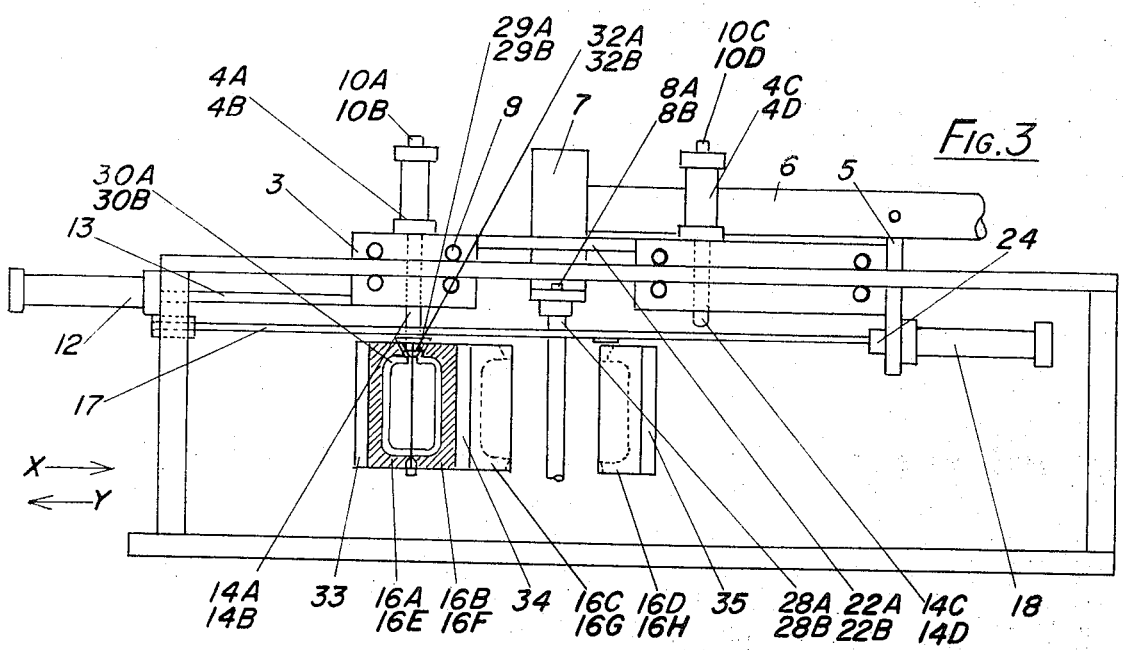
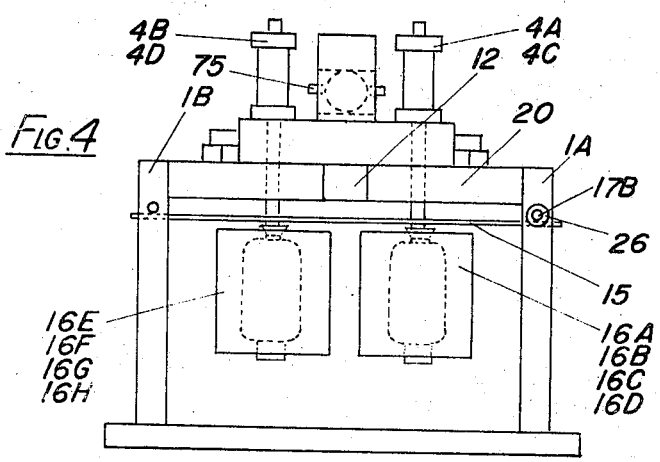
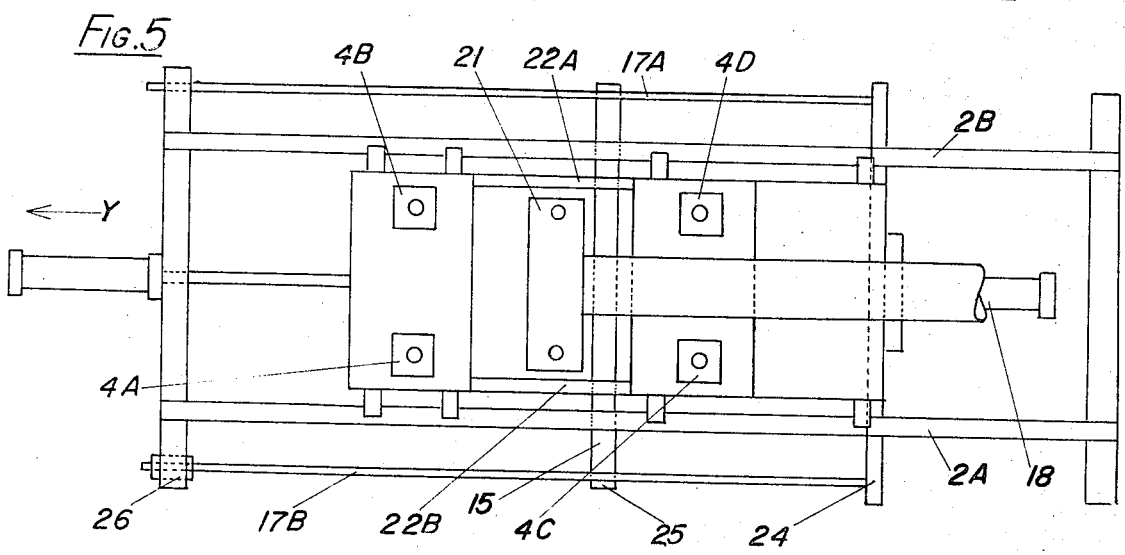

SECTION AA

BLOW MOLDING MACHINE

This a division of application Ser. No. 211,904, filed Dec. 27, 1971 now abandoned.

An object of this invention is to provide a novel method of making hollow articles which can if desired be completely finished within the mold.

Another object is to quicken, cheapen and improve the process of manufacture of hollow articles from thermoplastic materials.

A further object is to provide a novel design for machinery for manufacturing hollow articles from thermoplastic materials.

With these and other objects in view the invention consists of the hereinafter described novel combinations, method of operation construction and arrangement of parts shown in which:

FIG. 3 is a side elevation of the apparatus depicted in FIG. 2 but shown in the next moved position in the production cycle.

FIG. 4 is a front elevation of the apparatus depicted in FIG. 1.

FIG. 5 is a plan view of the apparatus depicted in FIG. 1.

Figure 1:
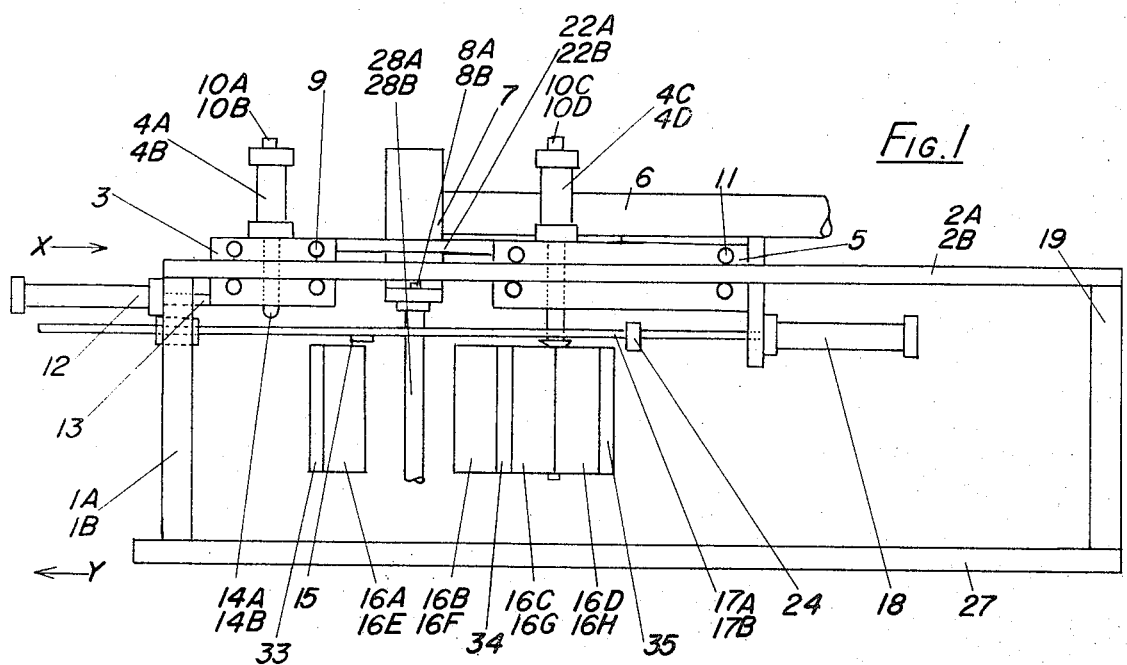
FIG. 1 is a side elevation of the apparatus according to the invention constructed for use in association with a screw or ram type extruder and including two mold stations to each of which is attached two single molds making a total of four molds which are split into eight mold halves, and shown at the beginning of a production cycle.

Referring initially to FIG. 1 front supports 1A and 1B and rear support 19 are mounted upon base plate 27 and are connected together at their upper ends by carriage supports 2A and 2B (FIG. 5), frame cross member 20 (FIG. 4) so as to form a framework which can be attached to an extruder or any other means of delivering an extruded parison or hollow body of material in a condition of plasticity. The extruder 6 is mounted upon knife carriage and extruder carriage 5, and is connected to extruder cross head 7 beneath which is mounted twin die manifold 21 (FIG. 5). The piston carriage 3 is secured to piston carriage rollers 9 which are mounted thereon so as to permit said piston carriage 3 to traverse carriage supports 2A and 2B when said piston carriage is actuated by traverse cylinder 12 which connects to said piston carriage 3 by means of traverse rod 13. Connecting rods 22A and 22B link said piston carriage 3 to knife cylinder and extruder carriage 5 thus providing for the extruder 6 which is mounted on said knife cylinder and extruder carriage 5 and which in turn is provided with extruder carriage rollers 11 which rest upon carriage supports 2A and 2B, to oscillate as determined by traverse cylinder 12 at the same time as piston carriage 3.

A piston cylinder and piston is provided to operate in conjunction with each mold cavity formed by each pair of mold halves and referring to FIGS. 3 and 4 it will be seen that piston cylinder 4A and piston 14A operate in conjunction with mold halves 16A and 16B. Piston cylinder 4B and piston 14B operate in conjunction with mold halves 16E and 16F. Similarly piston cylinder 4C and piston 14C operate in conjunction with mold halves 16C and 16D. Piston cylinder 4D and piston 14D operate in conjunction with mold halves 16G and 16H. Extruder cross head 7 is positioned exactly midway between the group of piston cylinders 4A and 4B, and the group of piston cylinders 4C and 4D, the length of the actuating rods 22A and 22B being such so as to insure that the distance between the center lines of each group of piston cylinders and the center line of the extruder cross head 7 is identical to the distance traverse rod 13 travels in each direction when operated by traverse cylinder 12 thus upon operation of the said traverse cylinder 12 piston cylinders 4A and 4B will then move to the exact center line position previously occupied by the extruder cross head and the twin die manifold 21 which is mounted on the center line of the said extruder cross head 7 and at the same time twin die manifold 21 will move to the exact center line position previously occupied by piston cylinders 4C and 4D.

Knife blade 15 FIG. 1 is mounted between two knife traverse rods 17A and 17B which are connected to and supported at one end by rod support 24 which is made of an insulating material and said rod support 24 is linked to and operated by knife cylinder 18. Various knife blade arrangements may be employed without departing from the novelty of this invention which is not limited to the specific hot knife blade arrangement shown, which provides for a terminal connection 25 FIG. 5 and an insulating bush 26 FIG. 5 contained within the front support 1A so that by applying a suitable electromotive force between front support 1A and terminal 25 electrical current will be conducted to the knife blade 15 via knife traverse rod 17A and by varying this current by suitable means the temperature of said knife blade 15 can be raised to a temperature in excess of that of the extruded parisons 28A and 28B which issue from die manifold 21 thus assisting the said knife blade 15 to make a clean open ended cut through the parisons. Although this invention can be used with either a single parison or any plurality of parisons without departing from the novelty thereof, twin die manifold 21 FIG. 5 depicts a typical manifold used for two parisons.

Figure 2:
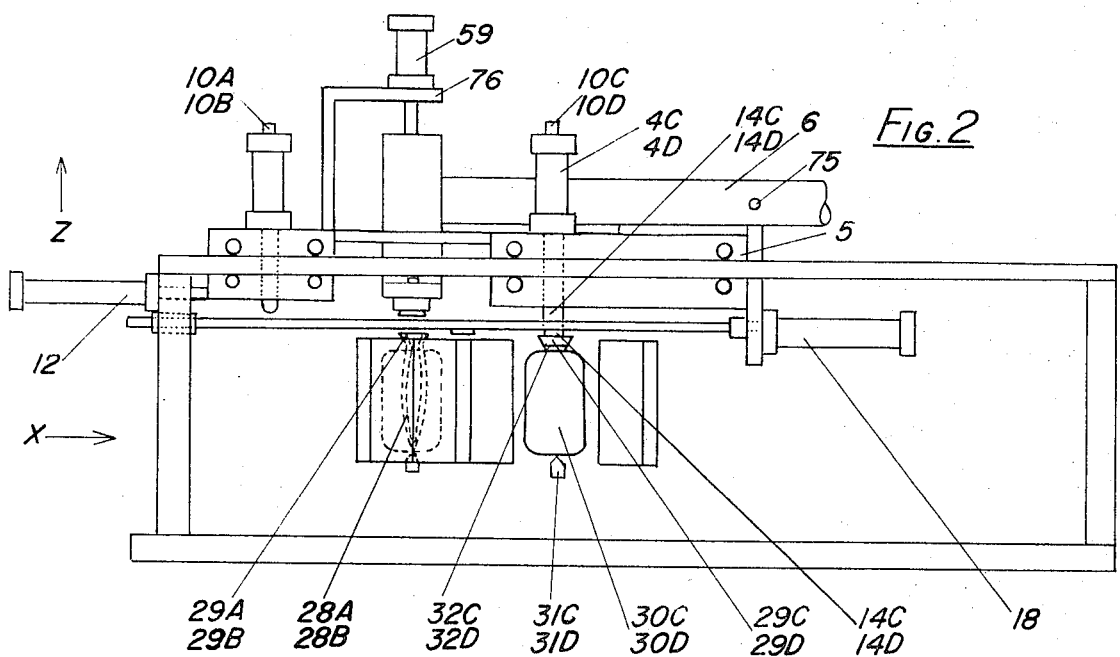
FIG. 2 is a side elevation of the apparatus depicted in FIG. 1 but shown at the next stage in the production cycle wherein the molds have moved to a new position.

The apparatus depicted in FIGS. 1 to 5 is a two station machine, one molding station being formed by front platen 33 and center platen 34 and the other molding station being formed by rear platen 35 and center platen 34 and it can be used in conjunction with the aforementioned twin die manifold 21 which allows for two parisons to be formed at each molding station in turn using a total of four molds i.e., eight mold halves mounted on the machine. Various well known means and combinations of fluid pressure operated cylinders and or toggles may be employed for opening and closing the mold halves and in the embodiment shown FIG. 3 center platen 34 is common to mold halves 16B, 16C, 16F and 16G, which are all mounted upon said center platen 34. Front platen 33 and rear platen 35 are directly linked so that they both always move in the same direction at the same time, whereas center platen 34 is linked so that it always moves in the opposite direction to said front platen 33 and rear platen 35 and in this manner as one pair of platens close at one molding station the other pair of platens opens at the other molding station in synchronism. In the embodiment shown FIG. 3 mold halves 16A and 16B are two respective halves of one mold which are arranged to close around parison 28A and similarly mold halves 16E and 16F which are mounted on the same pair of platens i.e., said center platen 34 and front platen 33 are arranged to close around parison 28B. Similarly mold halves 16C and 16D are arranged to close around parison 28A and mold halves 16G and 16H which are mounted on the same pair of platens i.e., said center platen 34 and rear platen 35 are arranged to close around parison 28B. For the purpose of forming hollow articles and based on a typical twin cavity arrangement, the sequence of operation is as follows:

Referring to FIG. 1 extruded parisons 28A and 28B are caused to issue from the twin die manifold 21 (FIG. 5) and the said parisons drop on the center line between mold halves 16A and 16B, and 16E and 16F. A timing means which may be electrical, mechanical or fluid pressure operated is provided so that when the parisons 28A and 28B are of a sufficient length to reach the lower edges of the said mold halves 16A and 16B, and 16E and 16F, the extrusion will cease and at the same time the said mold halves will commence closing around their respective parisons 28A and 28B. The said mold halves 16A and 16B, and 16E and 16F in closing pinch the lower ends of the parisons 28A and 28B so as to form a seal and the timing means then provides fluid pressure to the pre-blow orifices 8A and 8B FIG. 1 which connect such fluid pressure to the then sealed parisons 28A and 28B which accordingly expand and commence to take up the shape of the mold halves 16A and 16B, and 16E and 16F. The said application of fluid pressure to said pre-blow orifices 8A and 8B also causes the upper sections of the parisons 28A and 28B to expand and form a bubble in each of the top sections of the two molds formed by mold halves 16A and 16B, and 16E and 16F which bubbles also project above the tops of the said molds and are connected to the upper ends of the parisons remaining in the die manifold at that time in the cycle. When the mold halves 16A and 16B, and 16E and 16F are fully closed knife cylinder 18 operates and in so doing its moves knife blade 15 in the direction of arrow X FIG. 1 thus severing the bubbles formed at the tops of the pre-blown parisons 28A and 28B, leaving beneath the knife blade 15 two open ended pre-blown severed lengths of parison which are supported and prevented from falling into mold halves 16A and 16B, and 16E and 16F by virtue of the pre-blown parisons having expanded into the conically shaped upper sections of the said mold halves as shown in FIG. 2. At the same time as the said mold halves close the other four mold halves 16C and 16D, and 16G and 16H mounted on the machine at the second molding station, open and expose to view blown hollow articles 30C and 30D formed respectively between mold halves 16C and 16D, and 16G and 16H during the previous cycle of the machine, and the machine is then in the position shown in FIG. 2. The bottom flash 31C and 31D can also then be seen still attached to the blown hollow articles 30C and 30D, or if desired by well known existing means, movable grippers can be provided within the molds to pull off the bottom flash either prior or subsequent to the opening of the mold halves.

Immediately center platen 34 and rear platen 35 and thus the molds mounted on those platens are fully open, the hollow articles which were formed during the previous cycle around piston 14C and 14D, are ejected from the machine due to fluid pressure being applied by the timing means to the blowing air orifices 10C and 10D, thus causing the finished hollow articles 30C and 30D to strip from the pistons 14C and 14D in a downwards direction said hollow articles 30C and 30D having already been severed from the pre-blown sections 29C and 29D at points 32C and 32D respectively which said points indicate the shear line formed by suitably shaping the ends of the pistons 14C and 14D and their corresponding mating sections in the said molds 16C and 16D, and 16G and 16H so as to provide an interference fit. Timing means then causes piston cylinders 4C and 4D to retract in the direction of arrow Z FIG. 2 in so doing they raise pistons 14C and 14D upwards causing the severed pre-blown sections 29C and 29D to also move upwards until said severed pre-blown sections 29C and 29D reach the lower edge of the knife cylinder and extruder carriage 5 at which point the pistons 14C and 14D move through suitable bearing holes having the same diameter as the said pistons 14C and 14D plus a minimal clearance, thus effecting a stripping action of the said pre-blown sections 29C and 29D against the lower edge of the knife cylinder and extruder carriage 5 and said pre-blown sections then fall freely from the machine.

Immediately the pistons 14C and 14D reach the top of their stroke and thus complete the ejection, the timing means then causes traverse cylinder 12 to operate which moves the whole of the upper assembly including piston carriage 3 connecting rod 22A connecting rod 22B knife cylinder and extruder carriage 5 extruder 6 extruder crosshead 7 and die manifold 21 in the direction of arrow X FIG. 2 so that this said upper assembly then moves to its next cycle position and the timing means then causes the extruder to immediately commence delivering the next parisons 28A and 28B to the next molding station and the machine is then in the cycle position as shown in FIG. 3. In moving in the direction of arrow X FIG. 2 and FIG. 3 the extruder crosshead 7 and the twin die manifold 21 to which it is affixed travels to the exact center line position previously occupied by pistons 14C and 14D, and pistons 14A and 14B which then occupy the exact center line position previously occupied by the twin die manifold 21 before it moved in the direction of arrow X, are then caused to descend into the already opened end of the pre-blown sections 29A and 29B by operation of piston cylinders 4A and 4B by the timing means provided. Immediately the pistons 14A and 14B reach the end of their downward stroke, fluid pressure is caused to be applied to blowing air orifices 10A and 10B FIG. 3 so as to fully expand the already sealed parisons 28A and 28B to the configuration of mold halves 16A and 16B, and 16E and 16F. By suitably shaping the ends of the pistons 14A and 14B and their corresponding mating sections, in the said mold halves 16A and 16B, and 16E and 16F an interference fit is provided so as to insure pistons 14A and 14B sever the thermoplastic material at the mating sections from the pre-blown sections 29A and 29B FIG. 3 and the blown hollow articles 30A and 30B as depicted in the mold sections 16A and 16B and shear lines 32A and 32B FIG. 3.

The speed of the extruder is so regulated that by the time parisons 28A and 28B FIG. 3 reach the lower edges of mold halves 16C and 16D, and 16G and 16H sufficient time has elapsed to insure that the hollow articles 30A and 30B formed within mold halves 16A and 16B, and 16E and 16F during the previous cycle of the machine are sufficiently cool to permit the mold halves being opened without distortion of the formed hollow articles. The timing means then causes center platen 34 and rear platen 35 together with the mold halves 16C and 16D, and 16G and 16H which are mounted thereon to close around extruded parisons 28A and 28B and at the same time the movement of center platen 34 in the direction of arrow X FIG. 3 and the reverse movement in the direction of arrow Y FIG. 3 of front platen 33 and rear platen 35 causes the mold halves 16A and 16B, and 16E and 16F which are mounted on said platens to open, exposing to view blown hollow articles 30A and 30B formed around pistons 14A and 14B during the previous cycle. The timing means then causes preblowing of the parisons in the closed mold halves 16C and 16D and 16G and 16H, and the causes knife cylinder 18 FIG. 5 to operate the knife 15 by means of the tie rod on said knife cylinder 18 which connects to rod support 24 which holds knife traverse rods 17A and 17B on which is mounted the knife 15. In operating in the direction of arrow Y the knife blade 15 severs the bubbles formed at the top of the pre-blown parisons 28A and 28B which are supported and prevented from falling into the mold halves 16C and 16D, and 16G and 16H by virtue of the conically shaped upper sections of the said mold halves into which part of the bubbles have expanded. The carriages 3, 5 are moved in the direction of arrow Y to bring the pistons 14C and 14D into alignment with the molds 16C and 16D and 16G and 16H. Piston cylinders 4C and 4D are then caused to operate and they in turn operate pistons 14C and 14D which descend into the already opened end of the parisons 28A and 28B trapped within the mold halves 16C and 16D, and 16G and 16H and the timing means provided then connects fluid pressure to blowing orifices 10C and 10D thus connecting such fluid pressure to the parison lengths within each of the said molds which accordingly expand and take up the shape of the mold halves 16C and 16D, and 16G and 16H and by reason of contact with the mold halves which may if necessary be cooled by a fluid medium the blown hollow articles 30C and 30D then formed, commence to cool. Immediately center platen 34 and front platen 33 and thus the mold halves 16A and 16B, and 16E and 16F mounted on said platens are opened, the blown hollow articles 30A and 30B are ejected from the machine by fluid pressure being applied by the timing means through blowing air orifices 10A and 10B thus causing the hollow articles 30A and 30B to be ejected from the machine in a downwards direction, said hollow articles having already been severed from the pre-blown parisons 29A and 29B at the shear lines 32A and 32B FIG. 3 at the time pistons 14A and 14B descended into the pre-blown lengths of parison when they were supported by mold halves 16A and 16B, and 16C and 16D.

The timing means then causes piston cylinders 4A and 4B to retract and in so doing they raise pistons 14A and 14B upwards causing pre-blown sections 29A and 29B to also move upwards until they reach the lower edge of the knife cylinder and extruder carriage 5 as before and the pre-blown sections 29A and 29B then fall freely from the machine. Immediately pistons 14A and 14B reach the top of their stroke and thus complete the ejection part of the cycle, the timing means causes traverse cylinder 12 to operate again but this time in the direction of arrow Y FIG. 1 and the traverse rod 13 which is linked to the piston carriage 3 causes said piston carriage, connecting rods 22A and 22B, knife cylinder and extruder carriage 5, extruder 6, extruder crosshead 7 and die manifold 21 to move in the direction of arrow Y FIG. 1 for the distance, as previously mentioned, established by the length of movement of traverse cylinder 12 such distance being identical to that distance provided between the center line of pistons 14A and 14B and the center line of the die manifold 21 which as previously mentioned is the same distance as that provided between the center line of the twin die manifold 21 and pistons 14C and 14D. Immediately this movement is completed the machine is again in the general position as shown in FIG. 1 and the extruder is caused to start so that extruded parisons 28A and 28B issue from the twin die head 21 and the cycle repeats as before.

Operation of the machine as described heretofor provides for interruption of the extrusion for a short time interval of the order of one second approximately which is equal to the time between the closing of one of molds, the ejection of the previously finished hollow articles and the movement of the machine to its next extrusion position.

The interruption of the extrusion can if desired be obviated by the addition of a pivot 75 together with an extruder lift cylinder 59 and lift cylinder bracket 76 as shown in FIG. 2 and this arrangement which allows for continuous extrusion throughout the complete cycle operates as follows:

The parisons are extruded as before described and immediately they reach the lower edges of the mold halves said mold halves close around them and in closing cause the activation of the preblowing to form the bubbles and then activation of the extruder lift cylinder 59 which lifts extruder crosshead 7 and twin die manifold 21 in an arc around pivot 75 provided on the extruder 6 FIG. 2. The lifting movement triggers the operation of knife blade 15 which severs the parisons as before, but the extruder which is pivotting in an arc upwards does not stop extruding during this period and immediately knife 15 has severed the parisons 28A and 28B traverse cylinder 12 is activated by the timing means so as to move the whole of the upper assembly as before to the next extrusion station and when it reaches said next station extruder lift cylinder 59 descends and causes extruder crosshead 7 and twin die manifold 21 to drop downwards to its normal position, and the cycle then repeats as above and generally as previously described. The extruder lift cylinder 59 operates at a greater linear velocity than the linear velocity of the extruded parisons 28A and 28B and this allows the extruder to continue extruding while the extruder crosshead and twin die manfold 21 is moving upwards and being transferred to the next extrusion station without the severed parisons contacting the new parisons then eminating from the twin die manifold 21. If it is desired to use only one mold at each of the mold stations, then the extrusion die heating connections and the air connections associated with each of the molds not required to be operated at each station can be simply disconnected, and in this way the machine as shown in FIGS. 1 to 5 would function with only two molds i.e., one complete mold at each station.

Figure 6:
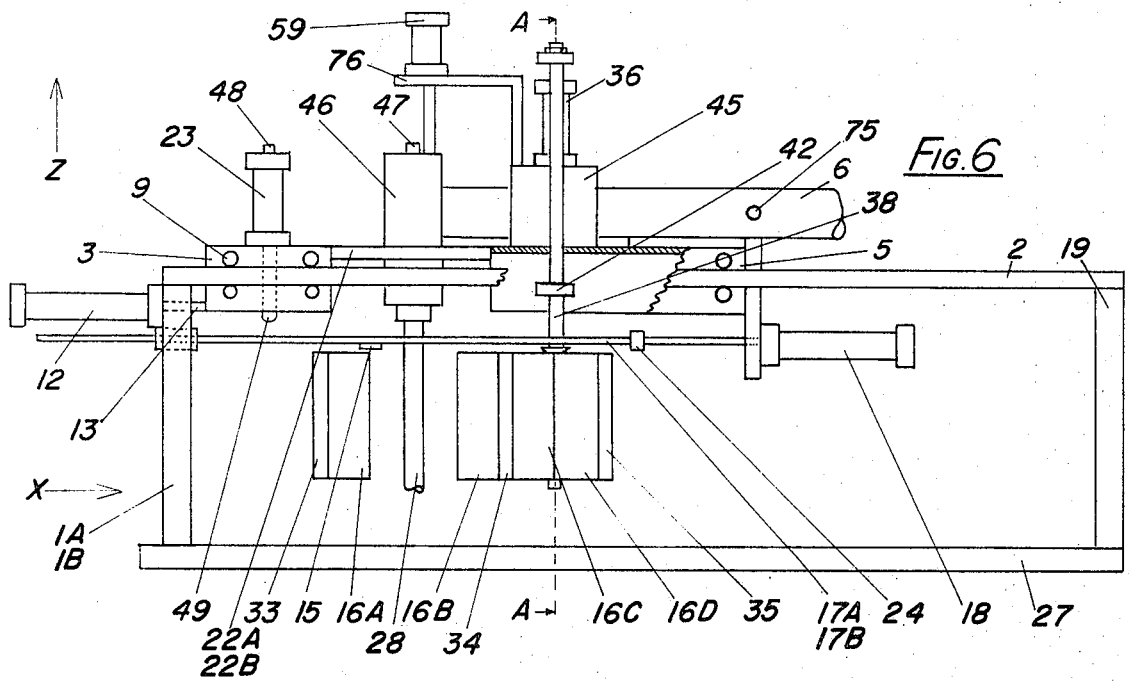
FIG. 6 depicts the same basic apparatus as in FIG. 1 but with only one single cavity mold at each station.
Figure 7:
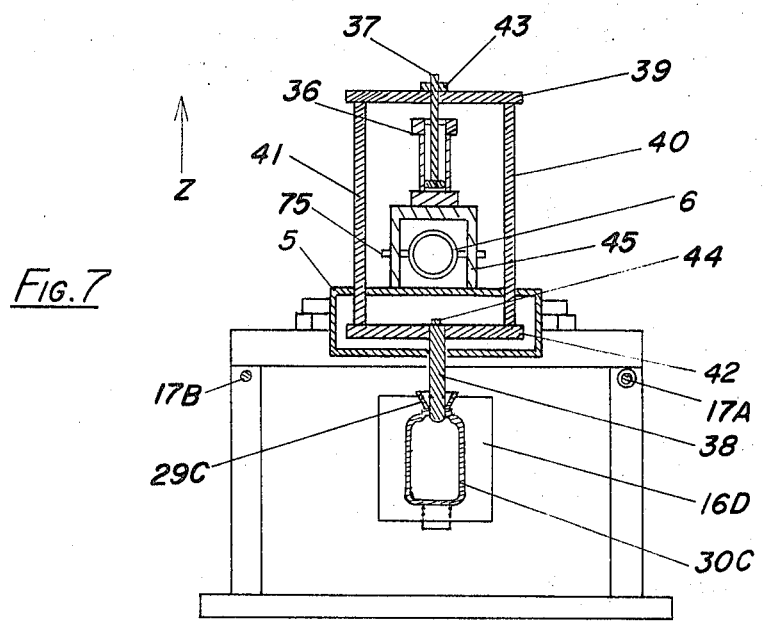
FIG. 7 shows a Section AA of the arrangement shown in FIG. 6.

Many other arrangements and embodiments can be provided for single mold operation at each of the two stations and one preferred embodiment is depicted in FIG. 6 which is a side elevation of the apparatus and FIG. 7 which is a section AA of FIG. 6. Referring to FIG. 6 the lay-out of the platens and pistons is generally as the apparatus depicted in FIGS. 1 to 5 except that in order to permit the two single cavity molds formed by mold halves 16A and 16B, and 16C and 16D to be mounted on the center line of the platens comprising front platen 33, center platen 34 and rear platen 35 which is also the center line of the single parison head 46 and thus the center line of the extruder 6 it is necessary to provide a suitable stirrup arrangement for operating rear piston 38 which must be situated directly under extruder barrel 6 which moves over it. The apparatus shown in FIG. 6 depicts an arrangement wherein rear cylinder platform 45 is mounted on knife cylinder and extruder carriage 5 and attached to the top of said rear cylinder platform 45 is rear piston cylinder 36. When it is desired to operate rear piston 38 rear piston 36 is actuated which causes rear piston cylinder rod 37 which is attached to stirrup upper member 39 to which it is secured by nut 43 to rise in the direction of arrow Z thus taking with it stirrup side member 40 and stirrup side member 41 both of which are attached to and take with them stirrup lower member 42 to which is attached rear piston 38 at the top of which said rear piston 38 is rear piston blowing air orifice 44.

For the purpose of forming hollow articles based on a typical two station machine as shown in FIG. 6 and FIG. 7 with a single cavity mold at each of the two stations the sequence of operation is as follows:

Extruded parison 28 FIG. 6 is caused to issue from the single parison head 46 and said parison forms on the center line between mold halves 16A and 16B which are respectively carried by front platen 35 and center platen 34. When the parison 28 is of a sufficient length to reach the lower edges of mold halves 16A and 16B said mold halves close around the parison and in closing pinch the end of the parison 28 so as to form a seal. Timing means is provided at that point in the cycle to apply fluid pressure to the pre-blow orifice 47 which connects such fluid pressure to the then sealed parison 28 which accordingly expands and commences to take up the shape of mold halves 16A and 16B. Application of the fluid pressure to the pre-blow orifice 27 also causes the upper section of parison 28 to expand and form a bubble in the top sections of the mold halves 16A and 16B which bubble also projects above the top of the said mold halves. The platens are linked together as previously mentioned by well known means so as to provide a direct link between front platen 33 and rear platen 35 which always move in the same direction at the same time whereas center platen 34 always moves in the opposite direction to said platens 33 and 35 so that as one pair of mold halves close the other opens in synchronism; therefore as mold halves 16A and 16B close around parison 28, mold halves 16C and 16D open and in opening expose to view the finished hollow article 30C formed during the previous cycle and which is then ejected from the machine by fluid pressure being applied by the timing means to the blowing air orifice 44 on the rear piston FIG. 7 whereupon the finished hollow article falls from the machine leaving the pre-blown section 29 still formed around the rear piston 38 which is then caused to rise in the direction of arrow Z FIG. 7 by means of the stirrup assembly comprising stirrup lower member 42, stirrup side member 40, stirrup side member 41, stirrup upper member 39 which is anchored to rear piston cylinder rod 37 by means of nut 43, and rear piston cylinder 36 in operating in the direction of arrow Z takes with it rear piston 38 which effects a stripping action against the lower edge of the knife cylinder and extruder carriage 5 so that the pre-blown section 29C then falls from the machine thus completing the ejection cycle.

When mold halves 16C and 16D open and thus mold halves 16A and 16B close knife cylinder 18 operates and in so doing it moves rod support 24 knife traverse rod 17A and knife traverse rod 17B to which knife blade 15 is attached, and knife blade 15 in moving cuts the parison as previously described. As knife cylinder 18 operates so also at the same time does extruder lift cylinder 59 mounted on lift cylinder bracket 76 causing the extruder barrel 6 to pivot around pivot point 75 FIG. 6 and the assembly comprising extruder barrel 6, single parison head 46 and pre-blow orifice 47 pivots upwards at a linear velocity in excess of the linear velocity at which parison 28 is being extruded parison the single poarison head 46. As soon as the knife blade 15 has finished cutting parison 28 traverse cylinder 12 operates causing traverse rod 13 to move in the direction of arrow X FIG. 6 and said traverse rod causes piston carriage 3 to move and take with it the upper movable assembly including connecting rod 22A, connecting rod 22B, knife cylinder and extruder carriage 5 and single parison head 46 which all move in the direction of arrow X for the distance established by the length of movement of traverse cylinder 12 and traverse rod 13 such distance being identical to that distance provided between the center line of front cylinder 48 and the single parison head 46 in its normal down position; it is also identical to the center line distance between rear piston cylinder 36 and the center line of the single parison head 46 when in its normal down position. Extruder lift cylinder 59 descends at the next mold station and the parison 28 which has been continually extruded, continues to be extruded between mold halves 16C and 16D. Immediately traverse cylinder 12 completes its stroke, front piston cylinder 23 and front piston 49 are positioned directly above and in line with the opened end of the parison lying within the confines of mold halves 16A and 16B and the timing means then causes front cylinder 23 to operate so that said front piston 49 descends into the already open end of the said parison 28 and the timing means provided thereupon connects fluid pressure to the then sealed parison which accordingly expands and takes up the shape of the mold halves 16A and 16B. The speed of the descent of the parison at the open mold station is regulated to match the time required by the cooling cycle at the closed mold station and immediately a parison of sufficient length has been extruded between mold halves 16C and 16D they then close and the cycle repeats as before. If continuous extrusion is not required then extruder lift cylinder 59 lift cylinder bracket 76 and pivot 75 can be omitted from the apparatus but it is then necessary to provide for the extrusion to be interrupted and to remain so interrupted from the time in the cycle at which each mold closes until the knife blade has completed severing the parison 28 and the upper assembly has moved to the new extrusion position at which time the extrusion can recommence and a suitable time interval can be provided by electrical and or mechanical means.

Figure 8:
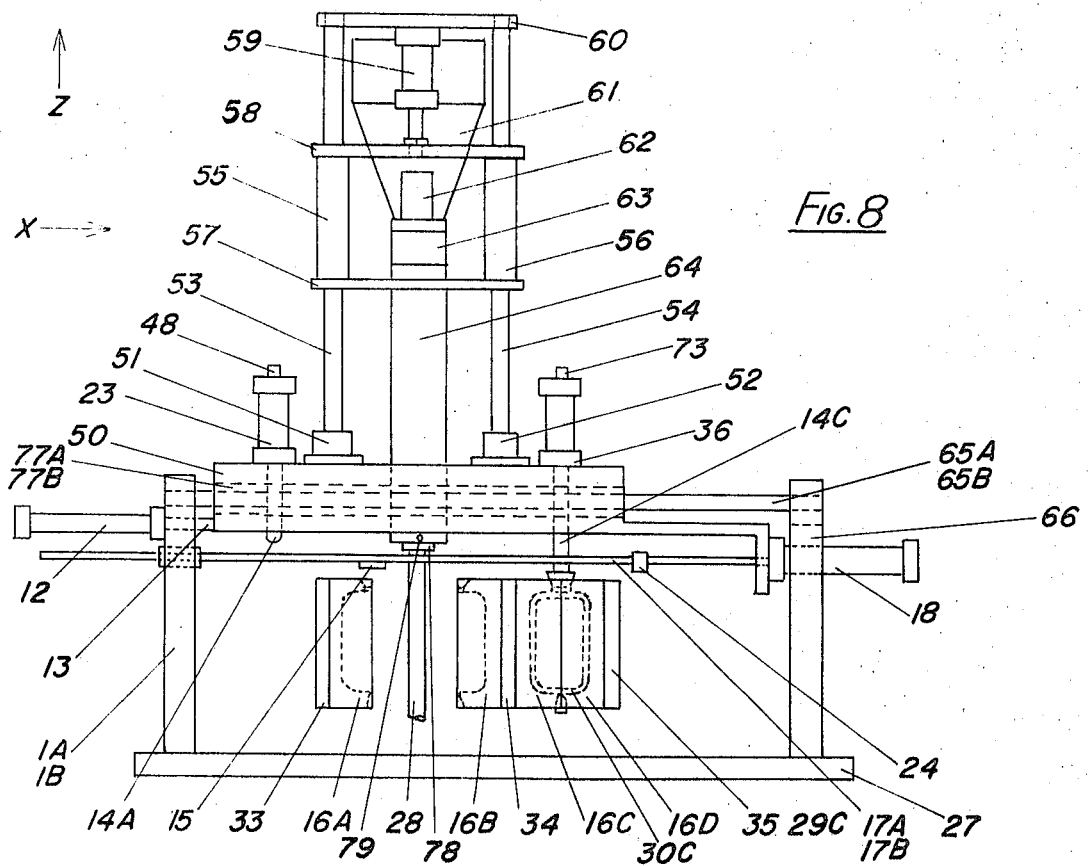
FIG. 8 is a side elevation of the apparatus constructed according to a preferred embodiment for use in association with a vertical extruder and including two mold stations with one single cavity mold mounted at each station.
Figure 9:
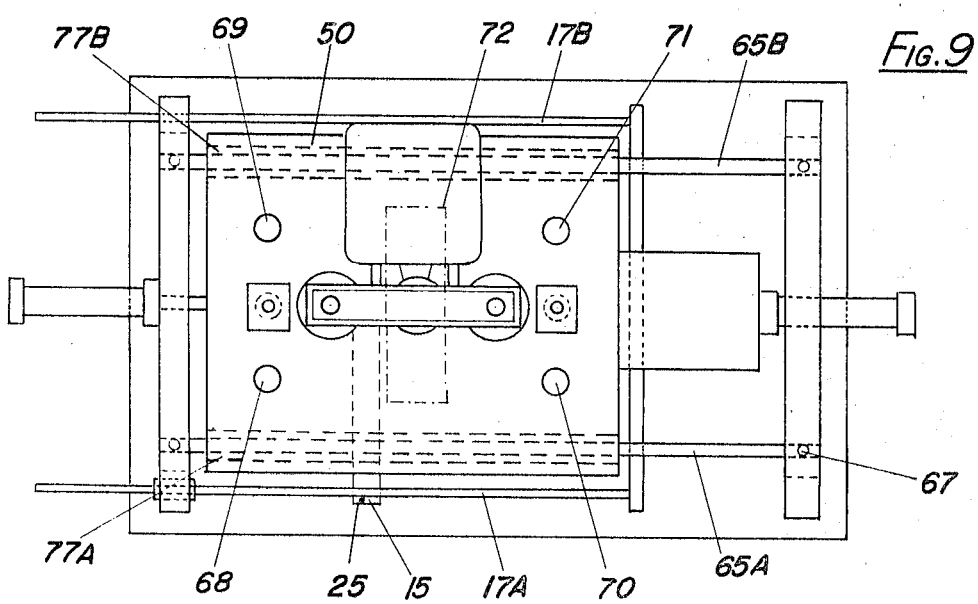
FIG. 9 is a plan view of the apparatus depicted in FIG. 8.

A further preferred embodiment of the invention is shown in side elevation FIG. 8 and plan view FIG. 9. Referring to FIG. 8 front support 1A and 1B and rear tie rod support 66 are mounted on base plate 27 and are connected together at their upper ends by main carriage tie rods 65A and 65B which are secured by locking screws 67 in order to form a framework on which main carriage 50 can move laterally being supported by sleeve bearing 77A and sleeve bearing 77B which ride respectively on main carriage tie rod 65A and 65B. The extruder assembly is mounted vertically and consists of the extruder barrel 64 to which is attached the combined thrust race and hopper feed block 63 and mounted immediately above said hopper feed block is a hydraulic extruder drive motor 62. The combined thrust race and hopper feed block 63 is attached to extruder platform lower member 57 which in turn is attached to front spacer 55 and rear spacer 56 both of which are connected at their upper ends by extruder platform upper member 58. Front spacer 55 and rear spacer 56 together with extruder platform lower member 57 and extruder platform upper member 58 are free to move in a vertical direction on front tie rod 53 and rear tie rod 54 which are secured at their lower ends by front support collar 51 and rear support collar 52 respectively to the main carriage 50 and they are joined at their upper ends by tie bar 60 on which is mounted the extruder lift cylinder 59 which is connected to the extruder platform upper member so that repeated operation of extruder lift cylinder 59 in both up and down directions will provide for vertical reciprocating motion of the extruder assembly. Mounted on main carriage 50 is front piston cylinder 23 with its associated piston 14A and rear piston cylinder 36 with its associated piston 14C. Hopper 61 which holds the unplastified material connects to combined thrust race and upper feed block 63 as shown FIG. 8 and therefore reciprocates with the extruder. A reciprocating knife assembly is provided comprising knife cylinder 18 rear support 24 knife traverse rods 17A and 17B knife blade 15 and terminal connector 25 as hereintofor described. The apparatus as constructed in FIG. 8 and FIG. 9 is shown with a typical set up which has one single cavity mold at each of the two mold stations formed by front platen 33 and center platen 34, and rear platen 35 and center platen 34. When it is desired to use the apparatus for twin cavity operation a twin die manifold can be mounted in the position outlined 72 FIG. 9. Use of the twin die manifold will enable four molds to be used i.e., two at each mold station in a similar manner to that mold arrangement shown in FIG. 4 and FIG. 5, and the four piston cylinders 4A,4B,4C and 4D then required would respectively be mounted in the alternative cylinder fixing positions 68,69,70 and 71 shown on main carriage 50 FIG. 9.

For the purpose of forming hollow articles with the apparatus embodiment of the invention as shown in FIG. 8 and FIG. 9 and based on a typical set up with two single cavity molds i.e., one complete mold at each station the sequence of operation is as follows:

The extruded parison 28 issues from the single extrusion die 78 and said parison forms on the center line between mold halves 16A and 16B mounted on front platen 33 and center platen 34 respectively. A timing means which may be electrical, mechanical or fluid pressure operated is provided, so that when parison 28 is of a sufficient length to reach or slightly extend beyond the lower edge of the mold halves 16A and 16B the front platen 33 and center platen 34 are caused to close so that mold halves 16A and 16B close around parison 28. In closing the said mold halves 16A and 16B pinch the lower end of parison 28 so as to form a seal and the timing means provided applies fluid pressure to the pre-blow orifice 79 situated on the single extrusion die 78 which fluid pressure is thereby connected to the inside of parison 28 and said parison accordingly commences to expand to take up the shape of mold halves 16A and 16B. Application of the fluid pressure to pre-blow orifice 79 also causes the upper section of the parison 28 to expand and form a bubble in the top of mold halves 16A and 16B as previously described. Knife cylinder 18 is then caused to operate and in so doing moves knife blade 15 in the direction of arrow X FIG. 8 thus severing the bubble previously formed at the top of the pre-blown parison 28, leaving beneath the knife blade the open ended pre-blown parison which is supported and prevented from falling into mold halves 16A and 16B by the conically shaped upper sections of the said mold halves 16A and 16B as previously described. The closing of front platen 33 and center platen 34 with the mold halves 16A and 16B which are mounted thereon causes the opening of mold halves 16C and 16D due to the previously described linking arrangement provided between front platen 33 center platen 34 and rear platen 35 so that when mold halves 16A and 16B close around parison 28 mold halves 16C and 16D open and expose to view the hollow article formed during the previous cycle, shown as 30C FIG. 8 and from which at the time in the cycle when the molds open the blowing air will have been exhausted by the timing means provided which applied the blowing air at the time mold halves 16C and 16D closed in the previous cycle. Immediately mold halves 16A and 16B close and at the same time as knife blade 15 commences to cut the parison 28 as mentioned, the timing means that causes extruder lift cylinder 59 to operate is actuated and said extruder lift cylinder lifts the extruder platform upper member 58 to which it is connected and this in turn takes with it front spacer 55 and rear spacer 56 which are joined to extruder platform lower member 57 which in turn is attached to combined thrust race and hopper feed block 63 of the extruder so that the complete extruder assembly is raised upwards in the direction of arrow Z FIG. 8 as determined by the linear velocity of said extruder lift cylinder 59 which velocity is arranged to be in excess of the linear velocity of the extruded parison 28 thereby insuring that as the knife blade 15 makes its cut across the bubble at the upper end of the parison 28 the end of the parison is left completely open after severing although parison 28 continues to extrude continuously from the single extrusion die 78.

Immediately knife blade 15 has completed cutting parison 28 traverse cylinder 12 is caused to operate and in so doing it moves traverse rod 13 in the direction of arrow X FIG. 8 which causes main carriage 50 to move in the same direction thus moving with it all the equipment mounted upon said main carriage 50 which thereupon moves for the distance established by the length of movement of traverse rod 13 such distance being identical to that distance provided between the center line of front piston 23 and the center line of single extrusion die 78 such distance also being equal to that between rear piston 46 and the center line of single extrusion die 78, and such movement thus positions piston 14A immediately above the already opened end of parison 28 which is supported by the conically shaped upper sections of mold halves 16A and 16B. Piston 14A is then caused to descend into the already opened end of parison 28 by operation of front piston cylinder 23 and the timing means then provides for fluid pressure to be applied for a pre-determined period to blowing air orifice 48 which is connected to said piston 14A and said fluid pressure then fully expands the already sealed parison 28 to the configuration of mold halves 16A and 16B. By suitably shaping the end of the piston 14A and the corresponding mating section in the said mold halves 16A and 16B an interference fit is provided as previously described to sever the plastic material at the said mating section. Extruder barrel 64 is at this point in the cycle situated directly on the center line of the mold station from which the hollow article 30C made during the previous cycle has already been ejected by re-application of fluid pressure to the blowing air orifice, such fluid pressure having been exhausted by the timing means provided just prior to the opening of mold halves 16C and 16D. Rear piston 36 has also at this time in the cycle withdrawn piston 14C which moves upwards in the direction of arrow X immediately mold halves 16C and 16D fully open, causing stripping of the pre-blown sections against the lower edge of main carriage 50 in a similar manner to that heretofor described. On its way to the second mold station formed by center platen 34 and rear platen 35 the extruder barrel 64 continues its upward movement due to the continuous action of the aforementioned extruder lift cylinder 59 and immediately main carriage 50 reaches the end of its travel so that the extruder is located directly on the center line between mold halves 16C and 16D, extruder lift cylinder 59 then operates in a reverse manner so that extruder barrel 6 moves downwards without any interruption to the extrusion. When the end of the extruded parison 28 reaches the lower edges of mold halves 16C and 16D said mold halves close around parison 28 and the cycle repeats as before. If continuous extrusion is not required then extruder lift cylinder 59 and its associated movable lifting assembly can be obviated and in its stead a suitable interval timer can be provided so that extrusion is caused to cease during the time between the closing of either pair of mold halves and the arrival at the next mold station of the extruder barrel. Although FIG. 8 and FIG. 9 depicts a typical embodiment utilizing a reciprocating extruder assembly any suitable means of delivering a parison from the extrusion die may be employed without departing from the novelty of this invention. When used with a twin die manifold and four single cavity molds i.e., two at each of the two mold stations, operation of the apparatus is exactly the same as heretofor described except that two parisons are produced from the twin die manifold which is mounted in the position outlined 72 FIG. 9 and thus two hollow articles are produced each time each mold station opens.

What we claim is:

1. Machine for the manufacture of blown hollow articles of plastics material, said articles having neck and body portions, comprising
   a. a frame structure,
   b. carriage means mounted for movement along a horizontal rectilinear path on said frame structure and carrying
      i. a plastics extruder connected with an extrusion nozzle comprising an annular die having its axis directed vertically downwards and a central core for extruding a plastics tube, said core having an air passage therethrough and opening through the bottom thereof,
      ii. first and second cylinders respectively actuating first and second piston rods for movement in a vertical direction relative to the carriage means and along axes which are respectively spaced by equal distances from and on opposite sides of the axis of said extrusion nozzle, each said piston rod having an air passage therethrough and opening through the bottom thereof,
      iii. a cutting device moveable relative to the carriage and below said extrusion nozzle for severing the plastics tube extruded through said nozzle, and
      iv. means for moving said cutting device,
   c. means for moving said carriage means back and forth on said frame structure along said path to move said extrusion nozzle between a first extrusion station and a second extrusion station spaced apart by a predetermined distance equal to the distance between the axis of either of said piston rods and the axis of said nozzle,
   d. a central platen and first and second outer platens mounted on said frame structure below said carriage and having surfaces to which halves of a split blow-mold are adapted to be secured, said platens being spaced apart with the said surfaces of the platens parallel to each other, the central platen being adapted to carry a mold half on each of its surfaces facing an outer platen and each outer platen being adapted to carry a mold half on its surface facing the central platen, said platens being mounted for movement in a horizontal rectilinear path perpendicular to said surfaces and parallel to the path of movement of said carriage means,
   e. means for moving said outer platens simultaneously in the same direction and said central platen in the direction opposite to the instant direction of movement of said outer platens whereby a first pair of mold halves between said first outer platen and the central platen will be opened simultaneously with the closure of a second pair of mold halves between said second outer platen and the central platen, and vice versa, the arrangement being such that when said first and second pairs of mold halves are closed they are respectively aligned with the extrusion nozzle when positioned in said first extrusion station and said second extrusion station respectively, and
   f. means for selectively admitting blowing air to the air passages in said core and said piston rods.

2. Machine according to claim 1, and including means establishing a cycle of operation including the steps of:
  i. moving the central platen and said first outer platen apart,
  ii. moving said carriage means to move said nozzle to said first extrusion station,
  iii. extruding plastic tubing through said nozzle at said first extrusion station,
  iv. moving the central platen and said first outer platen towards each other and simultaneously moving said central platen and said second outer platen apart,
  v. admitting blowing air through the air passage in said core while said nozzle is at said first extrusion station and then stopping the admission of blowing air therethrough,
  vi. operating said cutting device to sever the extruded plastic tubing from the plastic material in the nozzle while at said first extrusion station,
  vii. moving said carriage means to move said nozzle to said second extrusion station,
  viii. extruding plastic tubing through said nozzle at said second extrusion station,
  ix. operating said first piston cylinder to lower said first piston rod,
  x. admitting blowing air through the air passage to said first piston rod and then stopping admission of blowing air therethrough,
  xi. moving said central platen and said first outer platen apart and simultaneously moving said central platen and said second outer platen together,
  xii. operating said first piston cylinder to raise said first piston rod,
  xiii. admitting blowing air through the air passage in said core while the nozzle is at said second extrusion station and then stopping the admission of blowing air therethrough,
  xiv. operating said cutting device to sever the extruded plastic tubing from the plastic material in the nozzle while at said second extrusion station,
  xv. moving said carriage means to move said nozzle back to said first extrusion station,
  xvi. again extruding plastic tubing through said nozzle at said first extrusion station,
  xvii. operating said second piston cylinder to lower said second piston rod,
  xviii. admitting blowing air through the air passage in said second piston rod and then stopping the admission of blowing air therethrough,
  xix. again moving the central platen and said first outer platen towards each other,
  xx. operating said second piston cylinder to raise said second piston rod,
  xxi. and repeating the cycle from step (v).

3. Machine according to claim 1, and including means on said carriage for imparting vertical movement to said extrusion nozzle.

4. Machine according to claim 1, wherein said extruder comprises a vertically arranged extruder barrel having the extrusion nozzle at its lower end and means at its upper end for feeding plastics material granules to said barrel.

5. Machine according to claim 4, wherein said extruder is supported from said carriage by vertical guide members along which support means secured to said barrel are vertically slidable, piston-operated means being provided for moving said support means along said guide members between predetermined upper and lower positions relative to said carriage.

6. Machine according to claim 1, wherein said cutting device comprises a metal blade extending transversely of the path of movement of said carriage, opposite ends of said blade being slidable along respective guide bars extending parallel to said path of movement of the carriage, one end of each of said guide bars being secured to the carriage for movement therewith and the opposite end of each of said guide bars being slidable in bearings in the frame structure, and piston means on said carriage and connected to said blade for moving said blade along said guide bars.

7. Machine according to claim 6, wherein one of said guide bars provides an electrical connection between one end of said blade and the frame structure, and including electrical insulating means interposed between the other end of said blade and the frame structure, and electric terminal means for connecting said frame structure and said other end of the blade to a source of electric current.

8. Machine according to claim 3, wherein said extruder comprises an extruder barrel extending substantially horizontally in the direction of the path of movement of said carriage and connected at one end to said extrusion nozzle, pivot means spaced from said extrusion nozzle and connecting said barrel to said carriage for pivotal movement of the barrel about a horizontal axis transverse to the direction of the path of movement of the carriage, and piston means on the carriage connected to raise and lower the extrusion nozzle between predetermined upper and lower positions relative to the carriage.

9. Machine according to claim 1, wherein said extruder is connected with a plurality of downwardly directed extrusion nozzles having their axes arranged at spaced positions along a straight line at right angles to the path of movement of the carriage, and including a plurality of said first and second cylinders with the axes of their first and second piston rods arranged respectively along straight lines at right angles to the path of movement of the carriage and spaced apart corresponding to the spacing of the axes of the plural extrusion nozzles.

* * * * *